Nov. 19, 1940.  L. J. CLANIN  2,221,909
PACKER DRILL
Filed Feb. 16, 1939  2 Sheets-Sheet 1
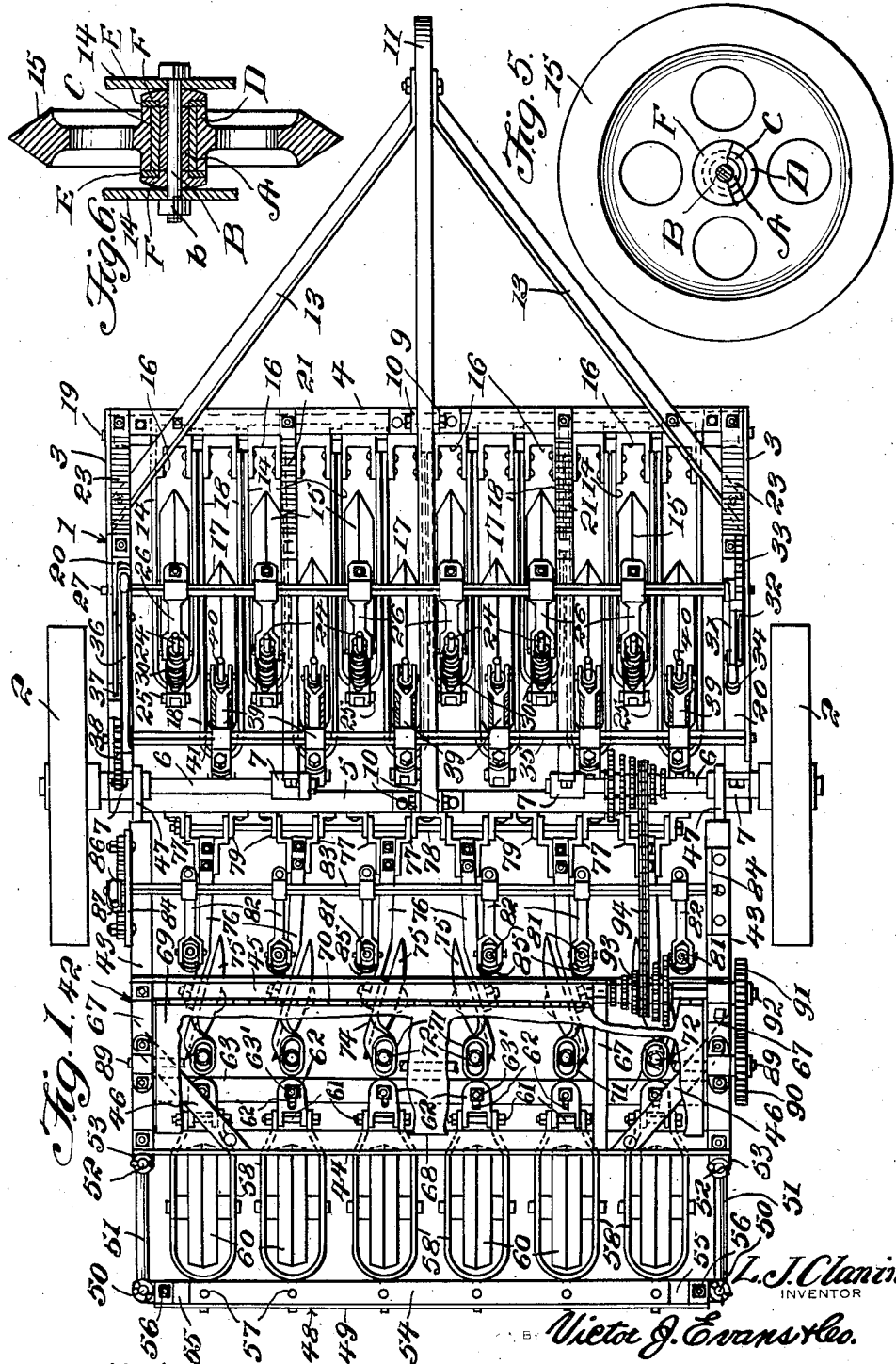
L. J. Clanin
INVENTOR
Victor J. Evans & Co.
ATTORNEYS
WITNESS J. T. L. Wright Nov. 19, 1940.    L. J. CLANIN    2,221,909
PACKER DRILL
Filed Feb. 16, 1939    2 Sheets-Sheet 2
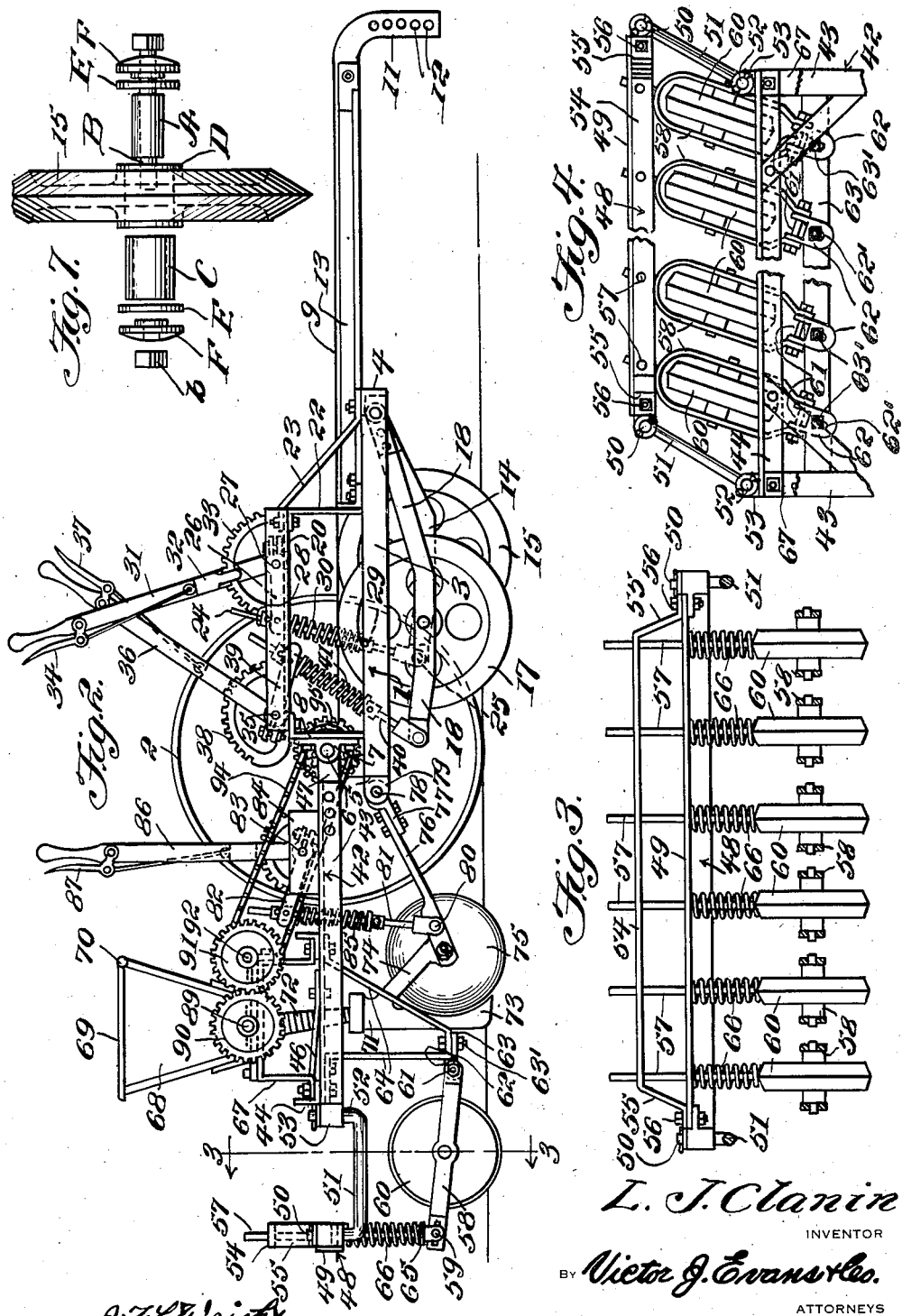
L. J. Clanin
INVENTOR
BY Victor J. Evans & Co.
ATTORNEYS
WITNESS J. T. L. Wright Patented Nov. 19, 1940

2,221,909

UNITED STATES PATENT OFFICE 2,221,909

PACKER DRILL

Lindley J. Clanin, Jewell, Kans.

Application February 16, 1939, Serial No. 256,796

4 Claims. (Cl. 111—59)

This invention relates to packer drills or seed planting machines of a character in which the correlated drilling and seed dropping means are carried on a traveling carriage in combination with advance packer means and a following pressure means.

The invention has for one of its objects to improve generally upon machines of this character and particularly in the simplification and economical production of the structure as well as in the simplification of the manipulative control of the machine, thereby to make for a more uniform planting of the seeds.

Another object is to provide for the selective use of the advance packing means, drill and seed dropping means and the following pressure means either conjointly or separately, at will.

With the foregoing and other objects and advantages to be attained, as will hereinafter more fully appear, the invention consists in the novel general structure and in the particular parts and combinations and arrangements of parts as hereinafter described and set forth in the appended claims, reference being had to the accompanying drawings illustrating a practical adaptation of the invention, in which—

Figure 1 is a top plan view of the assembled machine;

Figure 2 is a side elevation of the machine;

Figure 3 is a vertical section of the auxiliary trailer frame taken on or about the line 3—3 of Figure 2 looking in the direction of the arrows and with the presser wheels and certain other parts shown in elevation;

Figure 4 is a fragmentary plan view of the rear portion of the machine, showing the presser elements shifted in parallel relation to each other as when the machine is turned from its direct longitudinal direction during the travel thereof;

Figure 5 is a view of one of the advance packer wheels in side elevation and on an enlarged scale;

Figure 6 is a diametrical sectional view of the packer wheel and its preferred means of mounting; and Figure 7 is an edge view of the packer wheel shown in Figures 5 and 6 with the bearing elements detached therefrom.

Referring now to the drawings, the numeral 1 designates a rectangular body frame which is carried by the ground wheels 2, said frame including side members 3 of angle-iron section or other suitable commercial section, a front end member 4, and a rear end member 5. As shown, the mountings for the wheels 2 each include a stub-shaft 6 which is journaled, as at 7, on brackets 8 extending upwardly from the rear end member 5 of the frame 1, one of the brackets being located in proximity to the side member 3 of the frame and the other at a point between the side member and the middle of the frame. Extending longitudinally of the frame 1 and projecting some distance forwardly from the frame, is a draft bar 9, said bar being mounted between opposed pairs of brackets 10 located on top of the front and rear end members, respectively. At the outer end of the draft bar 9 is a downturned hitching element 11 which is provided with a series of apertures 12 so that it may be conveniently attached to a tractor or other means for drawing the machine in the use thereof. Preferably, the draft bar 9 is connected to the forward corner portions of the frame 1 by diagonal braces 13, which, as shown, are of angle-iron section.

Mounted in yokes 14 hinged to the forward portion of the body frame 1 are packer wheels 15 having oppositely beveled circumferential portions. As shown, the yokes 14 are each formed of a flat strip of metal looped intermediate its ends and attached at its ends to a substantially U-shaped block 16 which is hingedly mounted on a transverse supporting rod extending parallel to the front end member 4 of the body frame. As shown, there are six of the packer wheels 15 so mounted, and in staggered relation to said wheels 15 is a second set of six similar wheels 17 which are mounted in yokes 18 similar to said yokes 14, but considerably longer, said yokes 18 being mounted on the same supporting rod, which latter is designated by the numeral 19. In this connection, it is noted that the common axis of the second set of wheels 17 is rearwardly from the axis of the first mentioned set of wheels 15 and that the portions of the respective yokes 14 and 18 in which the respective wheels 15 and 17 are journaled are offset from the supporting rod 19 so as to be disposed substantially parallel with the under side of the body frame 1, the remainder of each yoke being inclined upwardly to the point of pivotal attachment on said rod 19.

On top of each side member 3 of the body frame 1 is a bridge frame 20 and at places between the side members 3 and the middle of the body frame is an additional pair of bridge frames 21, said frames 20 and 21 each including a horizontal elevated body portion the forward end of which is mounted on an upstanding supporting bracket 22 which is braced to the forward end portion of the body frame 1 by a diagonal stay member 23. The opposite ends of the horizontal members of the bridge frames are respectively supported rigidly on the upstanding brackets 3 hereinbefore described as supporting the stub-shafts 6 on which the ground wheels 2 are mounted. Preferably, as shown, the horizontal elevated members of the outer bridge frames 20 are of angle-iron section, but the corresponding members of the two inner bridge frames 21 are merely flat bars.

The bridge frames 20 and 21 afford substantial supports for the controlling means for the two sets of advance packer wheels 15 and 17 of the machine as will now be described.

At the looped end of each yoke 14 is a lug to which a tension rod 24 is pivotally attached, as at 25, said rod extending upwardly from the yoke through a swivel block of conventional character which is mounted in the bifurcated free end portion of a crank arm 26, pinned or otherwise fixedly mounted on a rock-shaft 27, said shaft 27 being journaled at its opposite ends on the horizontal elevated members of the bridge frames 20 and intermediate its ends on the corresponding members of the two inner bridge frames 21. Obviously, the tension rods 24 of the entire set of packer wheels 15 are alike in their mounting and manipulation, there being a conventional stop-collar 28 provided on each of the rods 24 in opposed relation to the top of the swivel blocks on the respective crank arms 26, whereby, when the arms are swung upwardly, the yokes 14 carrying the wheels 15 are raised. Interposed between the swivel blocks on the crank arms 26 and collars 29 provided on the lower portions of the rods 24, are spring elements 30 which are compressible by downward actuation of the crank arms 26 so as to place the packer wheels 15 under pressure in contact with the ground.

For actuating the several crank arms 26 simultaneously they are each accordingly fixedly mounted on the rock-shaft 27 and the latter is provided with an operating lever 31 at one end, said lever having a conventional latch element 32 engageable with a toothed sector 33 fixedly mounted on the adjacent bridge frame member 20, a suitable manual releasing device 34 for the latch element being provided on the operating lever. By this particular controlling provision for the packer wheels 15, the operating lever 31 may be moved in one direction to actuate the crank arms 26 so as to place the wheels in contact with the ground under the pressure of the spring elements 30, and by moving the operating lever in the opposite direction the crank arms 26 are swung upwardly and by the engagement of their swivel blocks with the upper collars 28 on the rods 24 the packer wheels 15 may be raised clear of the ground, and in either the raised or lowered positions of the wheels the operating lever 31 is locked to the toothed sector 33 by the latch element 32.

Similar controlling means for the companion set of packer wheels 17 is provided. That is to say, a rock-shaft 35, similar to the rock-shaft 27, is journaled on the bridge frames 20 and 21, said shaft being provided with an operating lever 36 at one end, preferably the end remote from the end of the shaft 27 on which the operating lever 31 is mounted, so that there may be no interference between the two operating levers 31 and 36. The operating lever 36 is provided with a latching means, designated generally by the numeral 37, to engage a toothed sector 38, similar to the sector 33 for the lever 31, said sector 38 being mounted on the adjacent bridge frame 20 where the lever 36 is located.

The rock-shaft 35 is provided with a series of crank arms 39, one each for the respective yokes 18 in which the packer wheels 17 are mounted, the yokes 18 and crank arms 39 being connected by tension rods 40 which are equipped with spring elements 41 and other associated adjuncts in a manner similar to the hereinbefore described tension rods 24 provided in connection with the yokes 14 and crank arms 26 for the packer wheels 15.

Hingedly attached to the forward body frame 1 is a trailing body frame 42 comprising side members 43 of suitable commercial angular section, a rear cross member 44 and an intermediate cross member 45, said cross members being also of suitable angular section. This frame 42 may be braced in any suitable manner as, for example, by diagonal members 46 located adjacent the rear corner portions of the frame and by other suitable members (not shown) located so as not to interfere with the mounting and operation of mechanical parts to be presently more fully described.

As shown, the forward end portions of the side members 43 of the frame 42 are provided with bracket extensions 47 which are hingedly supported at their outer ends on the respective stub-shafts 6 of the ground wheels 2. At the rear of the frame 42 is an auxiliary parallel swingable frame 48 comprising a rigid rear end member 49 which is hingedly attached at its opposite ends to upturned end portions 50 of swingable link members 51 whose opposite upturned end portions 52 are hingedly mounted in bracket members 53 provided therefor on the adjacent corner portions of the frame 42.

The end member 49 of the swingable frame 48 has a bridge member 54 extending lengthwise thereabove, said bridge member having downturned end portions 55 which are formed with ears at their ends and apertured to receive securing bolts 56 by which the bridge member is fastened to the frame member 49. The frame member 49 and bridge member 54 are provided with series of vertically alined apertures in which reciprocatory vertical stems 57 are slidably fitted and thereby guided. At the lower ends of the stems 57 yokes 58 are hingedly attached, as at 59, said yokes having presser wheels 60, journaled therein, the inner end portions of the yokes being hingedly mounted, as at 61, in bearing elements 62 provided therefor on a cross bar 63 which is carried by bracket members 64 depending from the cross members 44 and 45 of the trailer frame 42. Sleeved on the stems 57 between the under side of the frame cross member 49 and shoulders 65 formed on the stems just above their places of pivotal attachment to the yokes 58 are spring elements 66 which are under compression when the presser wheels 60 are in contact with the ground and the connected frames 42 and 48 are thereby supported by said presser wheels and the interposed spring elements 66. In this connection, it is pointed out that the bearing elements 62 for the inner ends of the respective yokes 58 are swingable in a common horizontal plane about the vertical axes of the bolts 63' by which said elements 62 are attached to the supporting bar 63.

By the foregoing described provisions, not only are the two connected frames 42 and 48 yieldably supported so as to compensate for unevenness in the ground surface over which the machine travels, but the auxiliary frame 48 is swingable laterally with the end member 49 of the frame maintained in parallel relation to the end member 44 of the trailer frame 42 when the machine is made to turn in either direction from its direct longitudinal travel, due to the peculiar pivotal connections between said auxiliary frame member 48, swingable link members 51 and the rear corner portions of said trailer frame 42. During this parallel swinging movement of the auxiliary frame 48 the yokes 58 are, of course, correspondingly swung to the angular positions, such movement of the yokes being permitted by suitably elongating the openings 62' in the bearing elements 62 through which the attaching bolts 63' are passed in the mounting of said elements 62 on the supporting bar 63. While the elongation of the openings 62' in the bearing elements 62 are essential for the swinging movements of the yokes 58 as just described, it is noted that such elongation of the openings 62' does not interfere with the proper tracking of the presser wheels 60 in the straight longitudinal travel of the machine but rather improves the flexibility and compensating up-and-down movements of the yokes 58 and the parts by which the outer end portions of said yokes are attached to the auxiliary frame 48.

The journal bearing and mounting provisions of the packer wheels 15 and 17 and the presser wheels 60 may be and preferably are the same. The bearing arrangements and mounting of a front packer wheel 15 is illustrated in detail in Figures 6 and 7, wherein the axle comprises a cylindrical metal core A having an axial bore to receive a headed supporting tie-bolt B which is inserted through apertures provided therefor in the opposite side members of the yoke 14 and secured in place by a nut b. The axle A may or may not be rotatable on the bolt B, as desired. However, a wooden bearing bushing C is sleeved to rotate freely on said member A and also in the bore of the hub portion D of the wheel 15, this bushing C being made of a characteristic wood or specially treated so as to serve as an oilless antifriction bearing element. At opposite ends of the hub portion D of the wheel and the bearing bushing C are placed washers E, the openings of which are of a diameter to receive rather snugly therein central bosses on thrust-collars F which are sleeved on the supporting tie-bolt and interposed between said washers E and the adjacent inner face portions of the longitudinal side members of the yoke 14. The same general bearing and mounting provisions are made for the other set of packer wheels 17 and the presser wheels 60. Therefore, no further detailed description as to the mounting of said wheels 17 and 60 is deemed necessary.

A transverse series of bridge frames 67 are mounted on the rear portion of the trailer frame 42 to support an elongated hopper 68 in which the seeds to be planted are placed, said hopper having a lid 69 hinged thereto along one longitudinal edge portion, as at 70. Said hopper 68 extends substantially the entire width of the frame 42 and is provided at intervals throughout the length of its bottom with outlet openings which are communicably connected to seed-dropping drill elements 71 by flexible tubes 72, said drill elements being respectively alined in longitudinal planes medially between correlated companion pairs of the advance packer wheels 15 and 17. The drill elements 71 which are of the usual conventional type are provided at their lower ends with shoe portions 73 which are projected into furrows cut in the soil by discs 75 which are carried in a fixed relation just ahead of the respective drill elements 71. As shown, the drill elements 71 are provided with downwardly inclined arms 74, forwardly thereof, on the lower portions of which arms the respective discs 75 are rotatably mounted, said discs being set obliquely with respect to the longitudinal axis of the machine, and, as shown, the discs being arranged in sets of three on each side of the longitudinal axis of the machine and at oppositely convergent angles (see Figure 1).

Extending upwardly at an inclination from the lower end portions of the arms 74 are supporting draft-arms 76 which are hingedly mounted by being provided with bifurcated bracket extensions 77 which are apertured to fit rotatably on a supporting rod 78 between bracket members 79 provided on the rear member 5 of the body frame 1 as supports for said rod 78. Hingedly secured to the lower portions of the supporting and draft arms 76, as at 80, are tension rods 81 whose upper end portions are slidable in swivel blocks provided therefor in crank arms 82, which latter are fixedly mounted on a rock-shaft 83 journaled at its opposite end portions on supporting brackets 84 provided therefor on the side members 43 of the trailer frame 42. The tension rods 81 are equipped with spring elements 85 and associated adjuncts similar to those of the hereinbefore described tension rods 24 and 40 of the advance packer wheel assemblies. The rock-shaft 83 is also provided with an operating lever 86 similar to the hereinbefore described levers 31 and 36, said lever 86 being provided with a manually manipulable means 87 which cooperates with a toothed sector 88 for releasably holding said lever in its different operated positions for either holding the discs 75 and their correlated drill elements 71 in working relation to the soil or in a raised position, at the will of the operator, it being, of course, understood that the trailer frame 42, through the intermediary of the laterally swingable auxiliary frame 48, is at all times yieldably supported on the presser wheels 60 whether the discs 75 and drill elements 71 are in working engagement with the soil or in a raised position.

In the operation of the machine, in the regular use thereof for which it is primarily designed, the main traveling support for the machine is by the provision and arrangement of the pair of ground wheels 2 on the stub-shafts 6 on which the rear portion of the forward body frame 1 and front portion of the trailer frame 42 are directly supported. In a plowed and prepared field which is furrowed to provide parallel ridges or hills, the advance packer wheels 15 and 17 travel in companion pairs on opposite sides of the prepared ridge or hill, said companion pairs of wheels 15 and 17 being at such relative nearness to each other that they travel on opposite sides of the ridge or hill rather nearer to the top than the base thereof, thereby compacting the soil and producing longitudinal depressions for the purposes of irrigation. Following this action and effect of the advance packer wheels 15 and 17 the obliquely set discs 75 cut longitudinal furrows medially of the ridges or hills into which the seeds are dropped from the drill elements 71. Next following the seed-dropping operation the presser wheels 60, which are respectively in longitudinal alinement with the drill elements 71 and companion discs 75, function to close the furrows cut by the discs and press the seeds into the soil. By the particular mounting and arrangement of the auxiliary frame 48, as hereinbefore described, the presser wheels 60 trail and track in the paths of the drill elements 71 and discs 75 whether the machine is traveling in a straight longitudinal line or deviating laterally therefrom in either direction. So, too, it is obvious that by manipulating the respective operating levers 31, 36 and 86, either set of the advance packer wheels 15 and 17 may be placed either separately or simultaneously with the other into working relation with the ground and likewise raised therefrom and operated either together with or separately from the discs 75 and drill elements 71, or, said elements 75 and 71 may be raised at the same time the packer wheels 15 and 17 are raised and the presser wheels 60 then used alone for certain desired treatment of the soil. It is here further pointed out that the machine while being ideally adapted for use on a furrowed field, as just above described, is also capable of use to good advantage on a level harrowed or other prepared field.

Obviously, the hopper 68 may be provided with any conventional seed discharging means. As conventionally shown, said means includes a shaft 89 extending from end to end of the hopper near the bottom thereof for operating whatever mechanism may be provided within the hopper, said shaft having a spur gear 90 on one end, outside of the hopper, in mesh with a driving gear 91 fixed on the end of a countershaft 92 journaled on the adjacent bridge frames 67 and provided with a series of stepped gears 93. A driving chain 94 is provided for connecting the respective gears of the stepped assembly 93 with a corresponding set of gears 95 which are fixed on the adjacent stub-shaft 6 which carries the ground wheel 2 at that side of the machine. By this provision, the shaft 89 of the discharging mechanism of the hopper is operated under the power of the stub-shaft 6 during the travel of the machine, it being understood that the desired speed of operation of the said discharging mechanism may be obtained by shifting the driving chain 94 accordingly on the stepped gear assemblies 93 and 95.

While the machine illustrated in the drawings embodies a practical adaptation of the invention, it is understood that considerable modification may be made therein without departing from the spirit and scope of the invention as defined by the appended claims. The invention, therefore, is not limited to the specific construction and arrangement shown in the drawings.

What is claimed is:

1. In an agricultural machine of the character described, a wheeled body frame and a trailer frame movably attached to said body frame and carried at its rear end portion on a presser wheel unit, a paired packer wheel unit carried at the forward portion of said wheeled body frame, and a combined furrow forming and drill unit carried by said trailer frame, said combined unit being interposed between the packer wheel unit and the presser wheel unit and comprising advance furrow-opening elements and companion follower seed-dropping drill elements in longitudinal alinement with the respective wheels of the presser wheel unit and medially of the respective companion pairs of wheels of the packer wheel unit.

2. In an agricultural machine of the character described, a wheeled body frame and a trailer frame movably attached to said body frame and carried at its rear end portion on a presser wheel unit, a paired packer wheel unit carried at the forward portion of said wheeled body frame, a combined furrow forming and drill unit carried by said trailer frame, said combined unit being interposed between the packer wheel unit and the presser wheel unit and comprising advance furrow-opening elements and companion follower seed-dropping drill elements in longitudinal alinement with the respective wheels of the presser wheel unit and medially of the respective companion pairs of wheels of the packer wheel unit, manually manipulable means for selectively raising said packer wheel unit clear of the ground and lowering the unit into working contact with the ground under adjustable spring pressure, at will, and similar means for raising and lowering said combined furrow forming and drill unit.

3. In an agricultural machine of the character described, a wheeled body frame and a trailer frame movably attached to said body frame and carried at its rear end portion on a presser wheel unit, a paired packer wheel unit carried at the forward portion of said wheeled body frame, a combined furrow forming and drill unit carried by said trailer frame, said combined unit being interposed between the packer wheel unit and the presser wheel unit in longitudinal alinement therewith, manually manipulable means for selectively raising said packer wheel unit clear of the ground and lowering the unit into working contact with the ground under adjustable spring tension, at will, similar means for raising and lowering said combined furrow forming and drill unit, a seed hopper on said trailer frame, a flexible communicable connection between said hopper and the drill element of said combined unit, and variable speed power driven means for selectively controlling the discharge of the seed from the said hopper.

4. In an agricultural machine of the character described, a forward body frame supported at its rear portion on a pair of ground wheels located respectively at opposite sides of the frame, said wheels having separate transversely disposed and alined stub-shafts journaled individually on said body frame, a transverse set of spaced advance packer wheels journaled in individual yokes pivotally mounted to swing vertically on the body frame from a common horizontal axis, a second set of similar wheels similarly mounted to swing from the same axis as said first mentioned set of packer wheels, the rotative axes of said second mentioned set of packer wheels being rearward of the rotative axes of said first mentioned set of packer wheels, the wheels of the one set being interposed between and in staggered relation to those of the other set but the respective adjacent pairs of the wheels so positioned being in companion working relation to each other, separate manually manipulable means for raising and lowering each set of said packer wheels independently of each other, said means including provision for releasably holding the respective sets of wheels collectively in either raised or lowered position and for exerting variable spring pressure on the individual wheels in their lowered ground-engaging positions, a trailer frame hingedly supported at its forward end to swing vertically on the rear portion of said forward body frame, an auxiliary supporting frame hingedly attached to the rear end portion of said trailer frame whereby to swing laterally but in parallel relation to said trailer frame, said auxiliary supporting frame being carried by a transverse series of presser wheels located respectively in longitudinal alinement medially between the companion pairs of said advance packer wheels, a transverse series of combined furrow forming and drill units carried beneath said trailer frame and each unit including an advance furrow-opening element and a companion follower seed-dropping drill element respectively coinciding in the alinement of said presser wheels with said companion pairs of advance packer wheels, said combined furrow-forming and drill units being respectively hingedly attached to said forward body frame whereby to swing vertically, manually manipulable means located on said trailer frame whereby to raise and lower said combined furrow-forming and drill units, and a seed hopper on said trailer frame having flexible tubular means of communication with the respective drill elements of said combined furrow-forming and drill units.

LINDLEY J. CLANIN.